United States Patent
Parady

(10) Patent No.: US 6,408,368 B1
(45) Date of Patent: Jun. 18, 2002

(54) OPERATING SYSTEM PAGE PLACEMENT TO MAXIMIZE CACHE DATA REUSE

(75) Inventor: Bodo Parady, Danville, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/333,418

(22) Filed: Jun. 15, 1999

(51) Int. Cl.[7] .............................................. G06F 12/00
(52) U.S. Cl. ..................................... 711/159; 711/163
(58) Field of Search ................................ 711/144, 145, 711/163, 159

(56) References Cited

U.S. PATENT DOCUMENTS

| | | | |
|---|---|---|---|
| 5,261,088 A | | 11/1993 | Baird et al. |
| 5,353,425 A | * | 10/1994 | Malamy et al. ............. 711/144 |
| 5,404,482 A | * | 4/1995 | Stamm et al. .............. 711/145 |
| 5,442,571 A | | 8/1995 | Sites |
| 5,561,786 A | | 10/1996 | Morse |
| 5,623,654 A | | 4/1997 | Peterman |
| 5,630,097 A | | 5/1997 | Orbits et al. |
| 5,787,447 A | | 7/1998 | Smithline et al. |
| 5,897,660 A | | 4/1999 | Reinders et al. |
| 5,974,508 A | * | 10/1999 | Maheshwari ................ 711/133 |
| 6,026,475 A | | 2/2000 | Woodman |

FOREIGN PATENT DOCUMENTS

| | | |
|---|---|---|
| EP | 0 568 221 | 11/1993 |
| WO | 83/00758 | 3/1983 |

OTHER PUBLICATIONS

Kernighan et al., *The C Programming Language*, Bell Telephone Laboratories, 1978, pp. 96–99 and pp. 173–177.
International Search Report, application No. PCT/US 00/14851, mailed Sep. 25, 2000.
Dong et al., "Least Recently Used Apparatus Alteration to Maintain Retriable Data in a Multiprocessor System," IBM Technical Disclosure Bulletin, vol. 27, No. 9, Feb. 1985, 1 pg.

* cited by examiner

*Primary Examiner*—Jack A. Lane
(74) *Attorney, Agent, or Firm*—Conley, Rose & Tayon, PC; Lawrence J. Merkel

(57) ABSTRACT

A software methodology to control replacement of one or more selected pages within a cache memory in a computer system. The operating system designates one or more pages containing critical data, text or other digital information as hot pages within a physical system memory in the computer system and prevents replacement during execution of various application programs of these hot pages when cached. The operating system inhibits allocation of the conflict pages that would map to cache locations occupied by a cached hot page, thereby preserving the hot page within the cache memory. The conflict pages are placed at the bottom of a free list created in the system memory by the operating system. The operating system scans the free list using a pointer while allocating free system memory space at run-time. The system memory pages are allocated from the free list until the pointer reaches a conflict page. This allows the operating system to prevent the conflict pages from getting cached to the hot page location within the cache memory. The operating system can also allow a user to designate one or more hot pages during run-time. The user is warned when the number of hot pages reaches or exceeds a predetermined limit.

23 Claims, 6 Drawing Sheets

US 6,408,368 B1

OPERATING SYSTEM PAGE PLACEMENT TO MAXIMIZE CACHE DATA REUSE

BACKGROUND OF THE INVENTION

1. Field of the Invention

The present invention relates to cache data management in a computer system, and more particularly to a software methodology to control replacement of one or more selected pages within a cache memory in the computer system.

2. Description of the Related Art

Modern multiuser/multitasking computer systems run complex operating systems to accomplish concurrent executions of myriad user applications. Broadly speaking, an operating system may be defined as a system software that schedules tasks for execution by one or more processing units in the computer system, allocates storage among various application programs, handles the system interface to the peripheral hardware, and presents a default interface to the user when no application program is running. Some examples of operating systems include the AT&T UNIX operating system; the IBM OS/2 operating system; the Microsoft Windows family of operating systems and MS-DOS; the Macintosh operating system; the Novell Netware; and the Digital Equipment Corporation's VMS operating system.

An operating system program may be divided into two parts: (1) the operating system kernel that contains the major operating system functions, such as the scheduler; and (2) various system programs which use facilities provided by the kernel to perform higher-level house-keeping tasks, such as providing an interface to various user application programs. An application program may be defined as a program that performs a specific function directly for the user (perhaps using one or more operating system services via the above mentioned interface). This is in contrast to system software, such as the operating system kernel, which supports the application programs. Word processing and spreadsheet software are common examples of popular application programs.

As used herein, the term "task" refers to a sequence of instructions arranged to perform a particular operation. Application software and the operating system may comprise one or more tasks.

In a typical multitasking operating system, memory management is usually employed for: (1) providing additional memory space when the physical memory space accessed by a processing unit is not large enough to hold all of the operating system and all of the application programs that are being executed by one or more users of the computer system; and (2) ensuring that executing tasks do not access protected areas of the physical system memory or those areas of the physical system memory allocated to other tasks. Generally, memory management may include allocating pages of physical memory for use by one or more tasks, mapping addresses generated by the tasks ("virtual addresses") to the allocated physical pages ("physical addresses") through an address translation mechanism, and deallocating pages released by a task.

A prior art system memory physical page allocation scheme is illustrated in FIG. 1. The computer system physical memory or system memory 12 may be visualized as being divided into a number of memory blocks or pages. Normally, the operating system kernel routines and relevant data as well as various software routines forming portions of one or more application programs being simultaneously executed by the operating system reside in the system memory 12, as respectively shown by the blocks numbered 11 and 13. The operating system software routines (block 11) and the application software (block 13) may require more than one memory page depending, among other things, on the page size and on the number of applications currently being executed.

During a program execution, a copy of a memory page 141 (i.e., the memory page 14) allocated to a program may be placed in the system cache memory 10. If the system cache memory 10 has no allocable space, then the system cache memory 10 may "flush" a corresponding page from the cache memory 10 to make space for the more recently accessed memory page 141. The cached page 14 typically contains a plurality of cache lines (or blocks), and caching is typically performed on a block by block basis rather than a page by page basis. Accordingly, caching a page actually involves caching the multiple cache lines of a page. Caching improves the rate of program execution by providing faster access for the processing unit to read data from/write data into the cached page 14 in the cache memory 10 during the corresponding application program execution.

It is understood that the cache memory space 16 of the cache memory 10 is typically smaller than that of the system memory 12. For example, when the cache memory space 16 is 1 MB in size and when the page size is 8 KB, the cache memory 10 may store up to 128 complete pages. However, the typical system memory physical space may be on the order of 64 MB, 80 MB, or even more. In that case, the system memory 12 may be visualized to contain 8192 or 10240 or more pages respectively. Further, it may not be desirable to increase the cache memory size 16 beyond a certain limit. In that event, the operating system may need to efficiently manage the resources of the cache memory 10 for a large number of applications that are currently under execution in the computer system.

When the user switches tasks or adds more applications for execution, the operating system may need to allocate one or more pages from the system memory 12 for the new tasks or applications. Under the prior art scheme of FIG. 1, the operating system uses a uniform method for allocating memory space, i.e., a request for a page of memory is allocated uniformly across the available memory space 20 according to any of the existing page allocation algorithms. This is illustrated in detail in FIG. 1.

The allocable memory space 20 may be considered to comprise two sections: (1) memory pages that map to the same cache memory storage locations as the cached page 14 when placed in the cache memory 10; and (2) the remaining memory pages, 15-1 through 15-N+2 and further, in the allocable memory space 20 that do not map to the same cache memory storage locations as the cached page 14. For the present discussion, the memory pages under (1) may be termed as conflict pages 18 and may be designated as conflict_page-1 (18-1) through conflict_page-N+2 (18-N+2) and onwards. The number of conflict pages depends on the size of the allocable physical memory space and on the size of the cache memory 10. In the previous example of the cache memory of 1MB size, the system memory of 80 MB can have a maximum of 79 conflict pages. The $80^{th}$ "conflict page" would be the cached page 141. In any event, the actual number of conflict pages may not be insubstantial. The memory pages under (2) may then be termed as non-conflict pages or free pages 15 (e.g., pages 15-1 through 15-N+2 and further) for the present discussion.

Under the uniform method of allocation mentioned above, the operating system may simply allocate a conflict page, e.g., the conflict_page-1 (18-1), after allocating the page 141. The same method is repeated when the need to allocate an additional system memory page arises. In that event, the operating system may again allocate another conflict page, e.g., the conflict_page-2 (18-2), after storing the conflict_page-1 into the appropriate memory location, i.e., the memory location 18-1. Unfortunately, allocating one or more conflict pages may cause the cached page 14 to be displaced from the cache memory 10 (when the conflict pages are accessed). Subsequent accesses to the page 141 may miss in the cache memory 10, increasing memory latency for the task to which the page 141 is allocated.

The increased latency described above is particularly a problem in that some data and text (i.e., instruction sequences) are frequently accessed and thus heavily limit access latency when not present in the cache. For the present discussion, these data may be referred to as "critical data" and may include not only data and text, but also various software routines, instruction codes or any other digital information already existing or being generated during an application program execution. The present operating system page allocation schemes may also cause a large number of conflict misses in the cache memory 10 when critical data is frequently replaced by other data or text that may have shorter cache lifetimes. Therefore, a method for efficient memory page allocation is desirable so as to maximize cache data reuse.

SUMMARY OF THE INVENTION

The foregoing described various problems that may frequently arise in case of the existing operating systems implementing a uniform method of physical system memory page allocation. The present invention contemplates a software methodology to control replacement of one or more selected pages within the cache memory in the computer system. In one embodiment of the present invention, the operating system is configured to designate a "hot page" within the physical system memory and to prevent the replacement of that hot page when placed within the cache memory during execution of various application programs. One criterion for selecting the hot page may be the existence of critical data within the hot page. In an alternative embodiment, the user may be allowed to designate one or more hot pages under the operating system control. However, the operating system may warn the user in the event that the number of hot pages placed within the cache memory exceeds a predetermined limit.

In one embodiment, the operating system inhibits allocation of the conflict pages that would map to the cache memory storage locations to which the hot page maps when cached. This may be accomplished by a sorted free list in the physical system memory where pages that would map to the same location as the hot page, i.e., the conflict pages, are placed at the bottom of the free list and the operating system may be configured to inhibit, to the extent possible, allocation of these conflict pages even if the system is paging. A pointer may be placed in the system memory for scanning the free list for allocable memory space. In one embodiment, the pointer may scan the free list from top to bottom (as pages are allocated) until a conflict page is reached. This may allow the operating system to prevent the conflict pages from getting cached to the hot page location within the cache memory.

In another embodiment, the compiler may mark critical data or text in a task that would remain in the cache while lightly used data in the task may be placed in those parts of the cache memory which may be replaced due to conflict misses. In a different embodiment, the operating system may be configured to establish the amount of conflicting page space within the free list ahead of time, i.e., prior to beginning the execution of one or more application programs. This may allow the operating system to efficiently identify the total allocable physical memory space beforehand and to accordingly allocate memory pages during program execution.

The present invention also contemplates a computer system whose operating system is configured to identify a plurality of hot pages within the system memory and to selectively prevent replacement of the plurality of hot pages during execution of one or more application programs. In a further embodiment, the present invention contemplates a storage medium that contains a cache data management program that is executable by a computer system when received from said storage medium and placed within a system memory in the computer system, and wherein upon execution said cache data management program designates a hot page within the system memory and identifies one or more conflict pages for that hot page. The cache data management program may also prevent the allocation of these conflict pages to one or more applications in the computer system. Alternatively, the cache data management program may configure the operating system to accomplish the desired controlled page allocation functionality.

The cache access times for critical data pages are thus improved through reduced access latencies. The efficient memory page allocation methodology according to the present invention thus allows for maximization in cache data reuse. Conflict misses in the cache are also prevented for selected memory pages.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
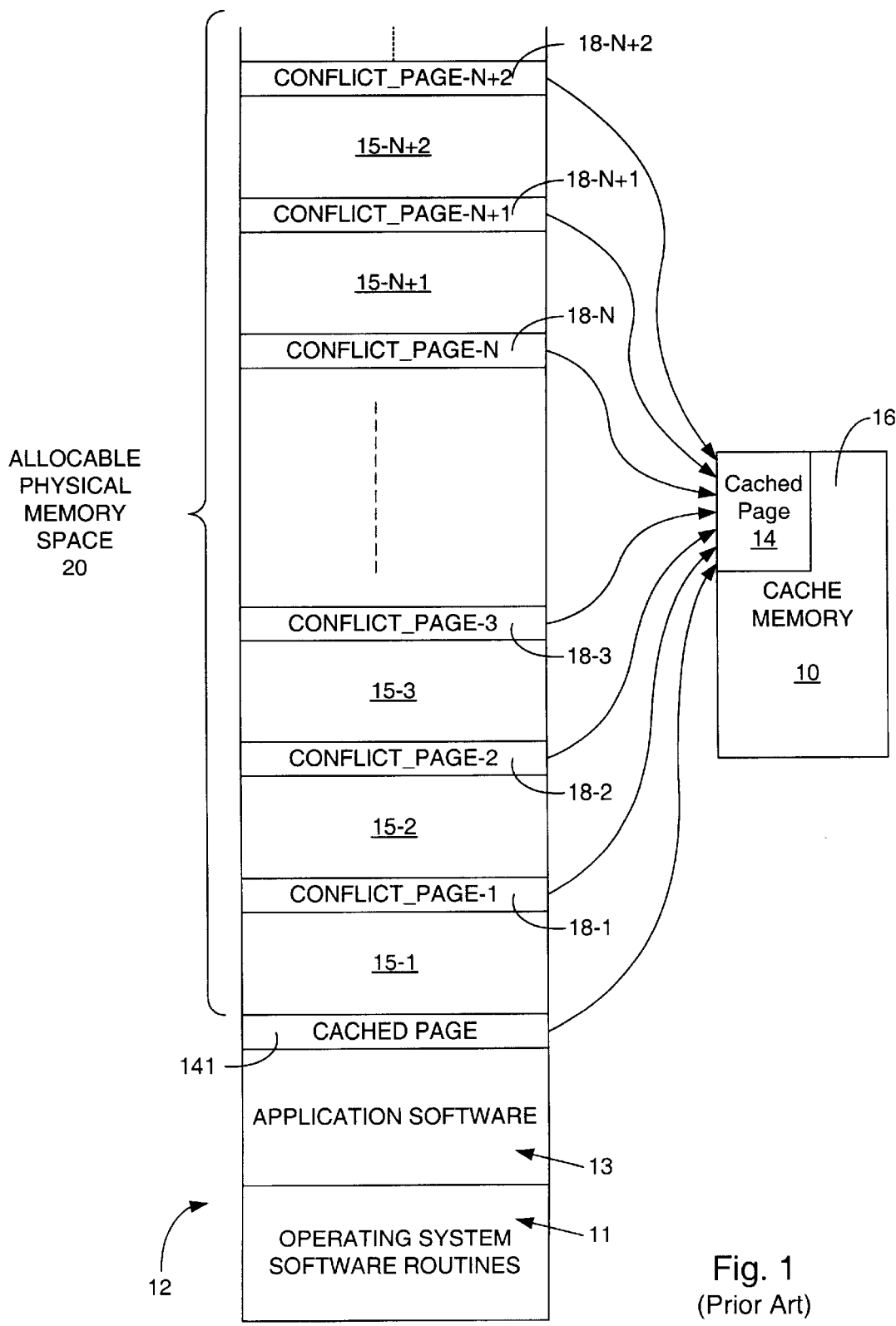
FIG. 1 illustrates how a prior art scheme allocates a memory page from the allocable physical memory space to an application being executed in a computer system.
Figure 2:
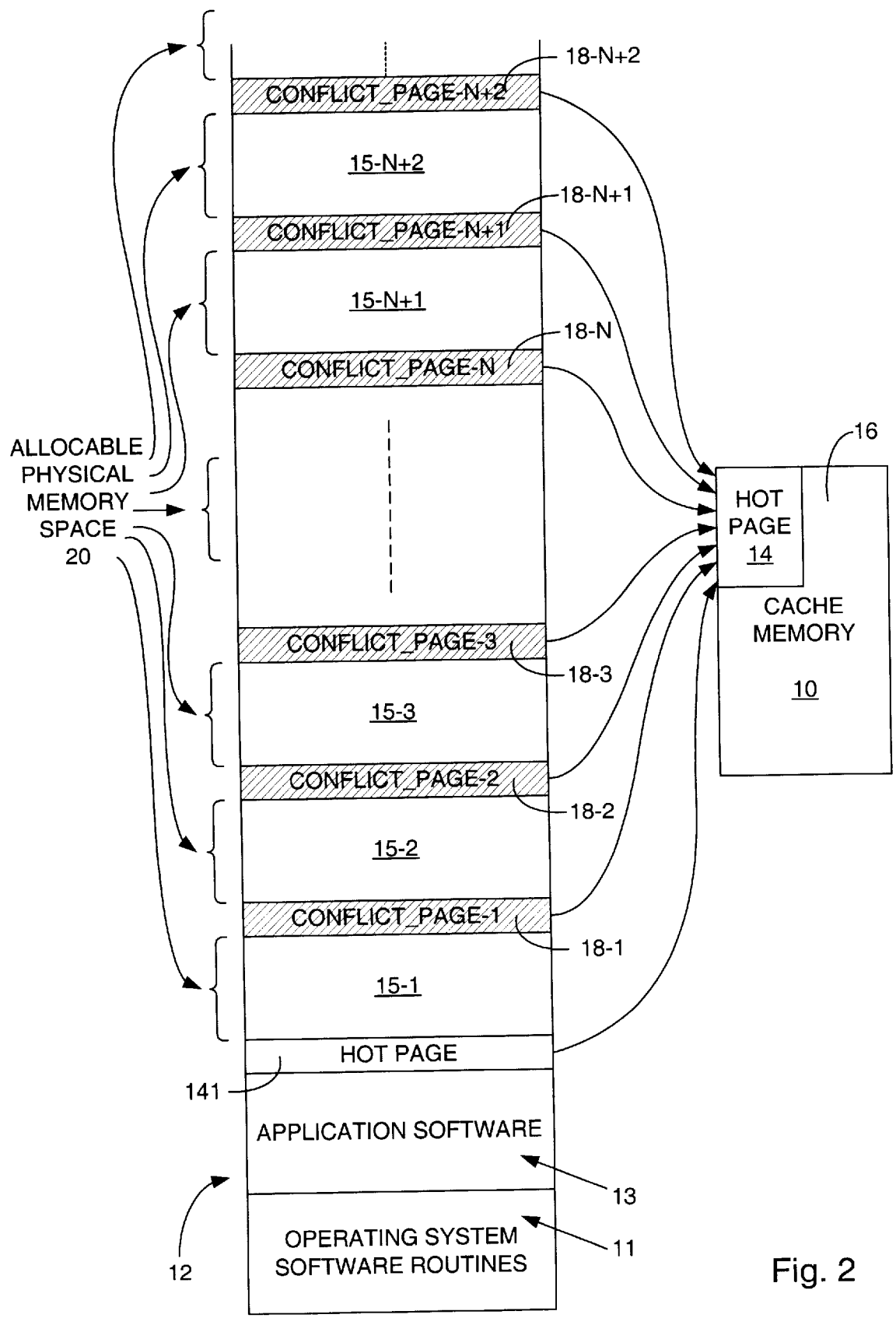
FIG. 2 depicts how the present invention determines the allocable physical memory space in the event of designating a hot page within the physical system memory.

Referring now to FIG. 2, the conflict pages 18 are shown hatched in the system memory representation 12. The system memory 12 may comprise any suitable memory device. For example, the memory 12 may comprise one or more RAMBUS DRAMs (RDRAMs), synchronous DRAMs (SDRAMs), static RAM, etc. As discussed earlier, a system memory page may contain some critical data For the present discussion, such a system memory page containing critical data is referred to as a "hot page."

As illustrated in FIG. 2, the operating system may be configured to restrict allocable physical memory space 20 to those areas 15 in the system memory 12 that exclude the conflict pages 18, the hot page 141, the application software area 13, and memory space containing any operating system kernel routines 11. Since the conflict pages 18 are not allocated, those pages are not accessed by the processing units within the computer system. Accordingly, hot page 14 may remain cached within the cache memory regardless of other activities within the computer system.

It is noted that the cache memory 10 may be part of a processing unit in the computer system, in other words, the cache memory 10 may be an internal cache. Alternatively, the cache memory 10 may be an external cache memory in the computer system. In one embodiment, the cache memory 10 may include both the internal cache and the external cache in the computer system. In the preferred embodiment, the cache memory 10 is an external cache memory. Further, the hatched representation of the conflict pages 18 is not meant to convey that the conflict pages 18 do not exist in the system memory 12. It is, however, simply meant to illustrate that the conflict pages 18 are not allocated (i.e., are not considered by the operating system to be part of the allocable physical memory space 20) to one or more applications running in the computer system when a hot page is designated in the system memory 12.

The hot page 14 in the cache memory 10 may contain more than one cache line (or cache block). In one embodiment, the cache memory 10 is a direct-mapped cache. Therefore, real memory addresses that represent the hot page 141 are mapped to only one location in the hot page 14 when cached. The operating system may not allow allocation of any of the conflict pages 18. This effectively preserves the hot page 14 in the cache 10 and prevents it from being replaced by one of the conflict pages 18.

In an alternative embodiment, the cache memory 10 is n-way ($n \geq 2$) set-associative (i.e., n lines per set) with S sets within the cache 10. In one embodiment, the 10 size (e.g., 8 KB) of the hot page 14 may be less than the number of sets S depending on n, the number of lines per set, and on the size of the cache 10 (e.g., 1 MB). If the size of the hot page 14 is more than the number of sets S, then more than one cache line in the hot page 14 may need to be stored in a set containing another cache block from the same hot page 14. In the preferred embodiment, the occurrence of such a "roll-over" is eliminated by having more sets than the number of cache lines in a page.

In a computer system with a set-associative cache memory 10, the operating system may be configured to implement in software a counter or a counter-type mechanism to maintain a count for the maximum number of conflict pages that may also be allocated along with the corresponding hot page 141. By way of an example only, when only one hot page 141 is designated, the operating system may set the highest count in the counter (not shown) to n−1. Therefore, a maximum of n−1 conflict pages (from the total conflict pages 18) may be simultaneously allocated with the hot page 141 to one or more program applications.

Generally speaking, if the number of hot pages is "m", i.e. when there is more than one hot page within the system memory 12 (and also within the set-associative cache memory 10), the maximum number of conflict pages that may be allocated along with in hot pages is n-m. In this manner the operating system may accomplish hot page preservation in the cache 10 along with simultaneous allocation of one or more conflict pages.

Figure 3A:
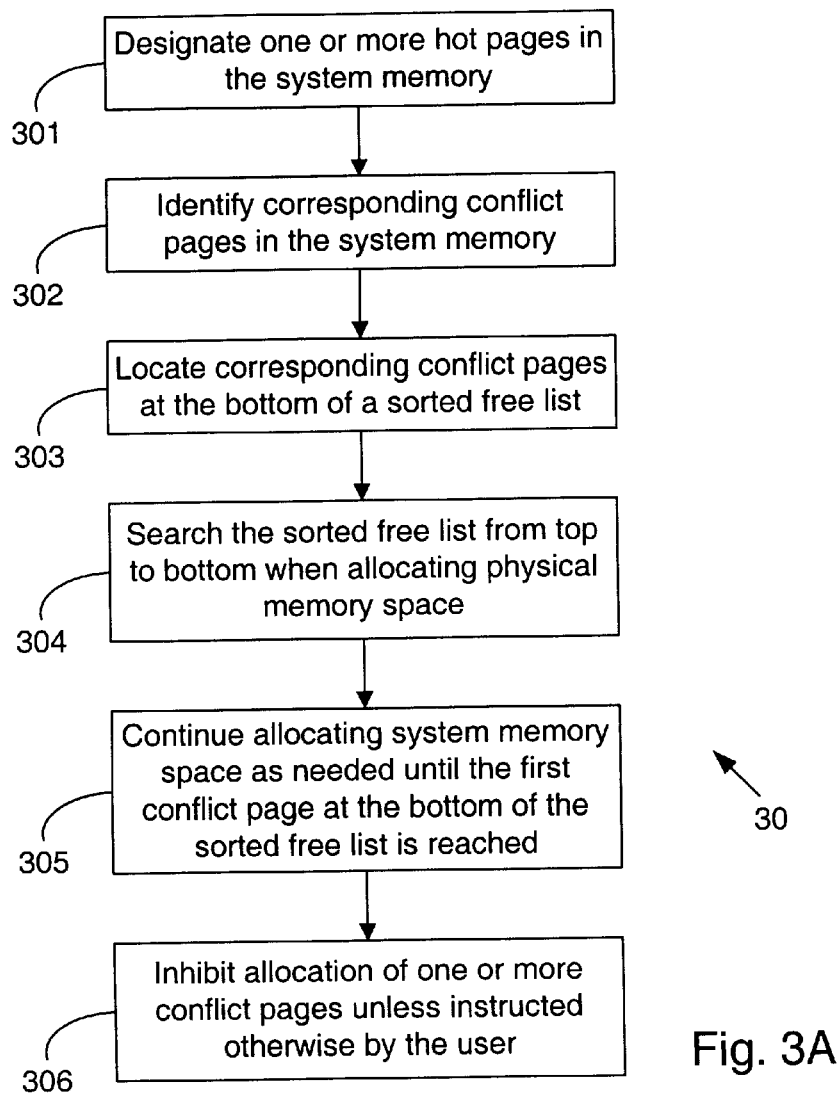
FIG. 3A shows a flow chart for implementing the methodology of one embodiment of the present invention.

Referring now to FIG. 3A, a flow chart for implementing one embodiment of the methodology for maintaining hot pages in the system cache memory is illustrated. The first step 301 involves designating one or more hot pages in the system memory 12. The total number of hot pages may be fixed or variable depending on the design choice. It is preferable, however, to have the total number of hot pages fixed so that the operating system may establish the amount of conflicting page space. At run-time, the operating system would designate one or more hot pages within that range of total number of hot pages. In one embodiment, the total number of hot pages may not exceed a predetermined limit because of the limited cache memory space 16 and because of the number of conflict pages 18 which are prevented from being allocated. In one embodiment, for example, the total number of hot pages may be restricted to eight with each hot page occupying 8 KB of cache memory of 256 KB. When the number of hot pages is dynamically modified, conflict misses may occur during cache memory accesses and overall system performance may be impacted.

Figure 3B:
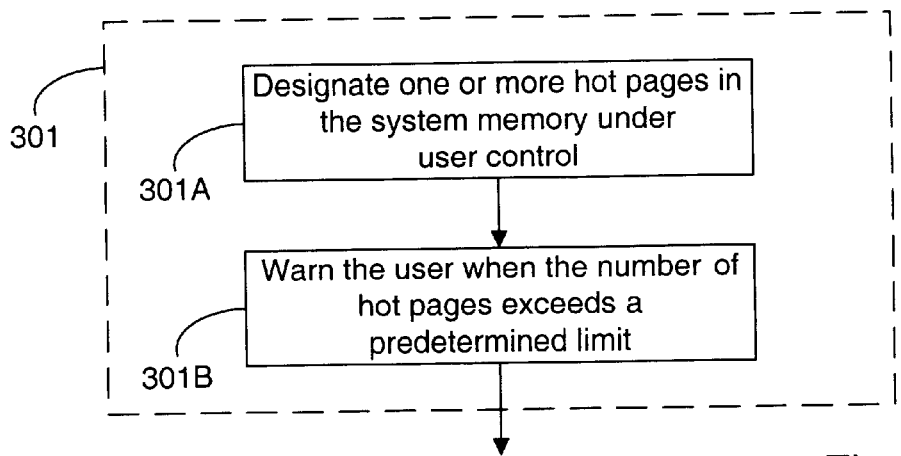
FIG. 3B is an exemplary illustration of how one step in FIG. 3A may be implemented.

FIG. 3B illustrates two sub-steps of the original step 301 in FIG. 3A. The operating system may be configured to designate one or more hot pages under user control (step 301A). In other words, the user may determine the critical data either at run-time or prior to a program execution and may, then, request that the critical data be marked as constituting one or more hot pages depending on the size of the critical data. The compiler software may also designate (to the operating system) relevant critical program data or text or any other digital information that need to remain in cache to enhance performance while lightly used data would be using other parts of the cache. An exemplary hot page may include instruction code that normally would conflict with data. In an FFT (Fast Fourier Transform) application software, the roots of unity may be placed as part of a hot page because of their constant reuse. The Fourier transform data may not be marked as constituting "critical data" because it may constantly change during FFT program execution, i.e., it may have a short cache lifetime.

If the total number of allocable hot pages is fixed, the operating system may prohibit the user to override the total number limitation. In an embodiment where the total number of hot pages may be flexibly determined or where the user may be allowed to go beyond the pre-fixed number of hot pages, the operating system in those situations may generate a warning message for the user when the number of hot pages reaches or exceeds a predetermined limit as determined by the operating system based, for example, on the cache memory size and on the system memory physical allocable space. This warning step is illustrated by block 301 B in FIG. 3B and may take one of several forms, e.g., audio warning signal, video display of a warning message, shutdown of one or more existing programs after warning the user, restarting of the computer system in the event that the user does not heed the warning, etc.

It may not be desirable to exceed the number of hot pages beyond a certain number because of potentially negative effects on the system performance. For example, because of the limited size of the cache memory 10, a large number of cache misses may occur and frequent thrashing of cache data may result when the cache memory 10 becomes largely filled with hot pages. Similarly, the operating system may experience "page crunch" when much of the system memory becomes unallocable because of large number of conflict pages. This may result in frequent, and slower, accesses to an auxiliary memory storage, e.g., a hard disk drive.

Further, increased reduction in allocable physical memory space 20 may result in reduced application program execution performance, especially when the number of simultaneously executed program applications is large and the number of allocable physical memory pages are substantially reduced. To avoid such negative performance impacts, the operating system may be configured to determine the optimum number of hot pages that a user may be allowed to designate in view of the capacities of the system memory 12 and cache memory 10. However, as mentioned before, in the preferred embodiment the number of hot pages remains fixed and may not be changed by the user or may not be dynamically altered by the operating system.

Referring back to FIG. 3A, block 302 indicates that the operating system identifies a corresponding set of conflict pages for each hot page designated in step 301. By way of an example, when the hot page is of 8 KB size and the cache memory is of 1 MB size, then each conflict page (18-1, 18-2, 18-3, etc.) will be of 8 KB size and will have an address that is a multiple of 1 MB from the address of the hot page 141 as a base address. For example, the first 8 KB page in a 64 MB physical memory block may start at the following binary address:

(x x x x x x x x x x x x 10000000000000)

Further, all pages that map to the same cache memory storage location as the above hot page may have their addresses in the following binary form:

(x 00000000000000000000)

Thus, in the present example, conflict pages would be located every 1 MB in the system memory 12.

Figure 4A:
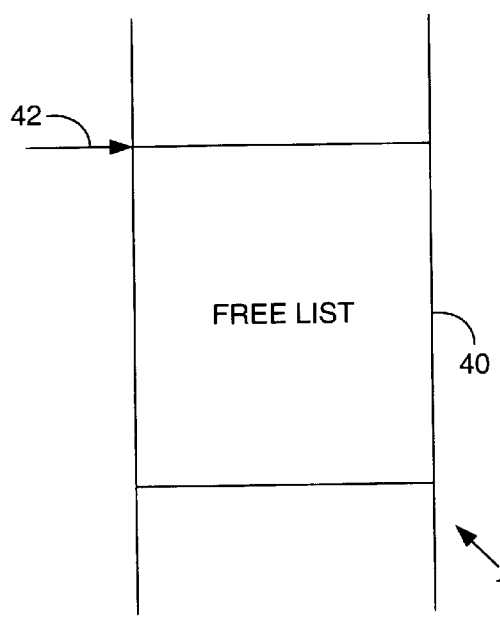
FIGS. 4A–4D illustrate the free list and pointer mechanism according to one embodiment of the present invention.

Referring now to FIG. 4A, a free list 40 is shown stored in the physical system memory 12. Generally, all allocable physical memory page addresses are initially stored in the free list 40 by the operating system. As each page gets allocated to an application, the operating system removes the page address information from the free list 40. Thus, the free list 40 may represent the available physical memory space that is free to be allocated at any given moment during program execution. Generally, the operating system allocates the page from the top of the free list 40 (indicated by a software pointer 42) in response to a page allocation request from a task. The pointer is then incremented to indicate a new top of the free list.

Figure 4B:
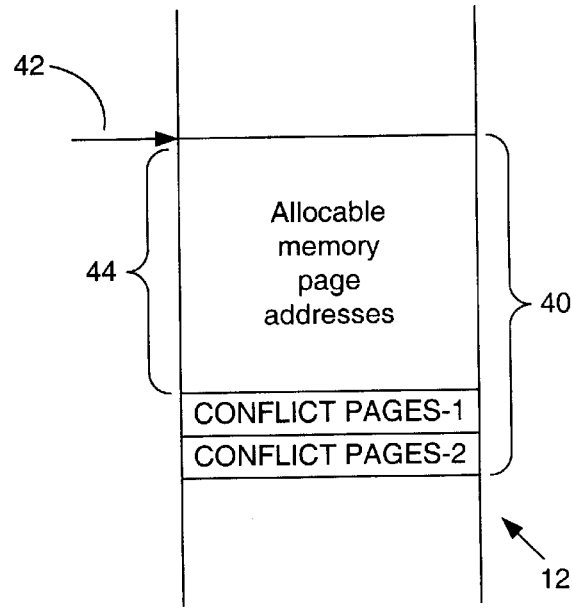
Figure 4C:
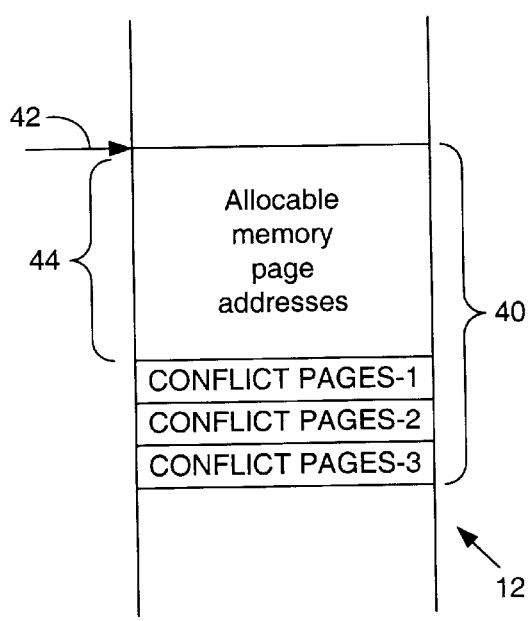
Figure 4D:
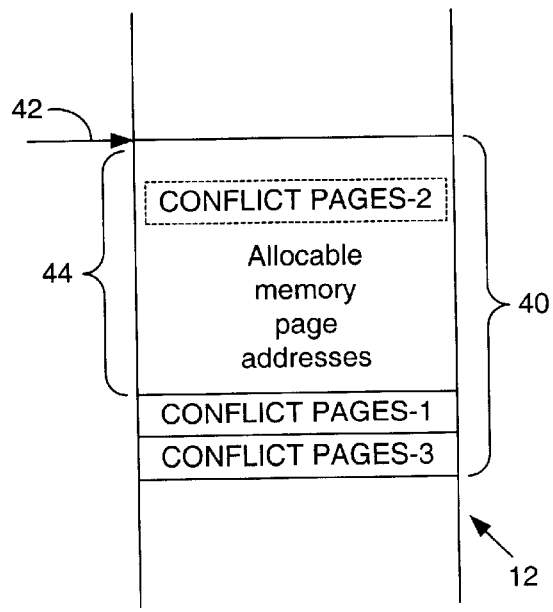

Consulting FIGS. 3A and 4A–4D together, in step 303 (FIG. 3A) the prevention of allocation of one or more conflict pages identified in step 302 may be accomplished by configuring the operating system to locate address information for the conflict pages at the bottom of the free list 40. FIG. 4B illustrates one such situation where hot page-1 is allocated before hot page-2, and the conflict pages corresponding to these two hot pages (conflict pages-1 and conflict pages-2) are placed at the bottom of the free list 40 creating reduced allocable memory page addresses 44. FIG. 4C illustrates a situation where one more hot page (hot page-3) gets allocated from the allocable memory page addresses 44. The address information for the corresponding set of conflict pages (conflict pages-3) may then be placed at the bottom most locations of the free list 40. Finally, FIG. 4D shows the conflict pages-2 as part of the allocable memory page addresses 44 when the corresponding hot page (hot page-2) is no longer allocated to an application program, i.e., when the hot page-2 address information is placed back in the free list 40. The other two hot pages (hot page-1 and hot page-2) are shown still allocated by the operating system in FIG. 4D.

It is noted that by merely placing the addressing information for conflict pages at the bottom of the free list 40 there is no reduction in the actual allocable physical memory space. Therefore, in one embodiment, the operating system may be modified to search the sorted free list starting from the top to the bottom when allocating the physical memory space (step 304) and may continue to allocate system memory space until the first conflict page location is reached in the free list 40 (step 305). Subsequently, the operating system may not continue allocating system memory space, i.e., the operating system may be configured to inhibit allocation of one or more conflict pages once all the pages for the physical memory locations represented by the numeral 44 in FIGS. 4B–4D are allocated (as indicated by step 306 in FIG. 3A). Because of the prevention of allocation of conflict pages through modified operating system software, the allocable memory page addresses 44 constrict at each instance of allocation of a hot page from the free list 40.

In one embodiment, the operating system may mark the addresses for conflict pages in the free list 40 using a flag or by adding a bit to each address. When a hot page is allocated, the addresses in the free list 40 that comprise one or more conflict pages may have their additional bits set so as to indicate to the pointer (while scanning the free list 40 from top to bottom during memory page allocation) that a conflict page address is reached. Based on the total number of hot pages, on the address locations for those predetermined hot pages, and on the size of the system memory 12, the operating system may be configured to mark in advance (as with a flag or with an additional indicator bit, as mentioned above) corresponding memory page addresses in the free list 40 so as to enable the operating system (at run time) to detect (through the pointer 42) when a conflict page location is reached while scanning the sorted free list. A bit may be considered "set" when it represents binary "1", and "reset" when it represents binary "0". Alternative identification schemes may be devised to accomplish the same.

The placing of locations of conflict pages at the bottom of the free list 40 and the variability in the size of the allocable memory page addresses 44 may be implemented using the following pseudo code.

```
top of free list=0
end of free list length of free list–1
for i=all in free list
   do
   if (modulo (i, cache size)=page reserved in cache)
   then
      end of free list–
      new free list (end of free list)=i
   else
      top of free list++
      new free list (top of free list)=i
end
```

The pointer 42 may help the operating system replace an allocated memory page back into the appropriate location in the free list 40. A program code similar to the one written above may be written to implement pointer functions in the operating system software.

Preferably, the sorted free list 40 and the searching of the free list (either through pointer 42 or through any suitable hardware or software mechanism) for allocable physical memory pages are kept simple for expedited processing of application programs. However, the operating system may be configured to give an override option to the user when the pointer 42 reaches the first conflict page location in the free list 40 (step 306, FIG. 3A). The user may, then, instruct the operating system to allocate one or more conflict pages even though that may result in displacement of corresponding hot pages from the cache memory 10. In one embodiment, the step 306 may also be modified in a manner similar to that illustrated for step 301 in FIG. 3B. In other words, the operating system may be configured to warn the user when the user elects to allocate a conflict page. The operating system may place a restriction on the number of conflict pages that may be simultaneously allocated by the user, in other words, the operating system may restrict the number of hot pages that may be replaced by the user during run-time. Appropriate audio, video or audio-visual warnings and/or shutdown operations may be executed by the operating system as described earlier with reference to FIG. 3B.

In one embodiment, the amount of conflicting space may be established by the operating system in advance of the execution of application programs. The conflicting space may then be marked as unallocable to an application program, e.g., by marking the bottom portion of the free list containing the location information of such pre-established conflict pages. In other words, the number of hot pages and address information of each hot page may be reserved in advance. During run-time, the operating system may simply allocate one or more hot pages from this reserved memory space. The operating system may identify these hot pages within the free list 40 until one or more of them are allocated.

In an alternative embodiment, the operating system may be configured to allow a user to establish a new free list containing user-defined hot pages and corresponding conflict pages. The user may be required to allocate hot pages from the predefined set of hot pages. Alternatively, the user may continue defining a hot page (within a predetermined limit, as discussed earlier) during run-time and the operating system may dynamically store corresponding conflict page locations within the new, user-created free list. The user may request that certain of his/her application pages be placed at the bottom of the user-created free list through an interface to malloc, calloc or mmap functions provided in the C programming language. For example, the top and the bottom of the user-defined free list may be specified by the following assignment operations:

u=calloc (getarea, TOP)

v=calloc (getarea, BOTTOM)

where "getarea" element may designate the size of the user-defined free list. Various alternative arrangements for designating hot pages are also possible as can be appreciated by one skilled in the art.

As mentioned earlier, it may be preferable not to vary the size of the physical memory space that may be designated as one or more hot pages, either during initialization or at run-time. In one embodiment, the critical data that can be placed into hot pages may be restricted to a maximum size of 64 KB allowing eight hot pages of 8 KB each. Page faults within the memory management unit (MMU) may occur when the size of physical memory space allocable as one or more hot pages is dynamically modified.

The foregoing discussion utilized the term "page" to refer to fixed-size memory blocks in a virtual memory addressing scheme. However, the present invention may also be implemented in a computer system where the memory addressing mechanism employs "segments" or variable size memory blocks, or a combination of paged and segment addressing. Furthermore, page size may be programmable.

As discussed before, the term "critical data" may refer to any significant digital information besides data and text generated during program executions. For example, the operating system may place, during initialization, the full content of the TSB (Translation Storage Buffer) in the computer system memory management unit into one or more hot pages in the cache memory 10. This may allow for faster handling of TSB misses from the cache memory 10, thereby alleviating the need to access the slower system memory 12 for TSB data. In one embodiment, the content of the TSB (for virtual to physical memory address translation) may be of the order of ½ MB. As another example, the operating system (or the user) may designate various interrupt service routines or trap handler code as constituting the "critical data." The operating system may, then, place such critical data into one or more hot pages in the cache 10 to allow for faster interrupt servicing in the system.

Figure 5:
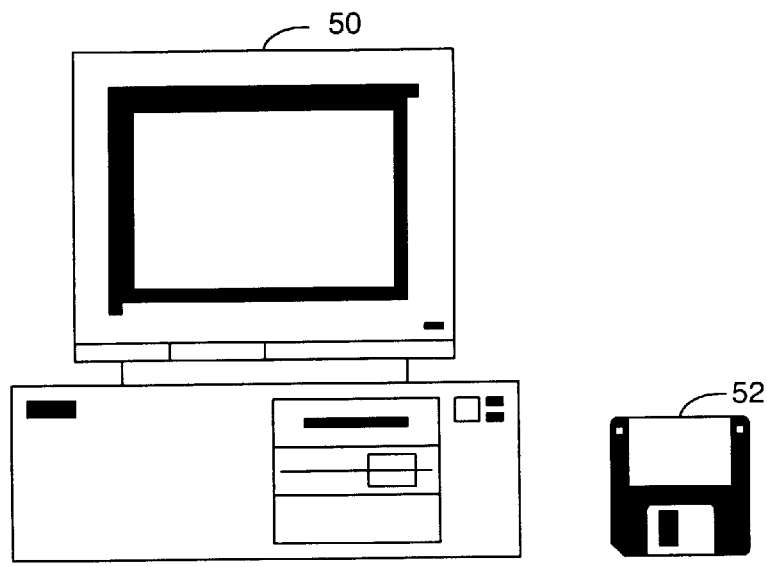
FIG. 5 shows an example of a computer system comprising an operating system configured according to the teachings of the present invention, and a storage medium containing the software embodying the teachings of the present invention.

Referring now to FIG. 5, a computer system 50 comprising an operating system configured to allocate pages and maintain hot pages as described above, and a storage medium 52 containing the memory management software embodying the code to maintain hot pages in the cache are shown. The storage medium 52 may take any of the various forms, such as a floppy disk, an optical disk, a magnetic tape, a compact disk, a video disk, etc. The storage device 52 may be external to the computer system 50, or it may be built into the computer system 50. The storage medium can be within another computer system 72 (FIG. 7) that transmits the operating system including the memory management software or simply the memory management software to the receiver computer system, e.g., one or more of the computer systems 74, 76 and 78 in FIG. 7, via a communication network as illustrated in FIG. 7.

Figure 6:
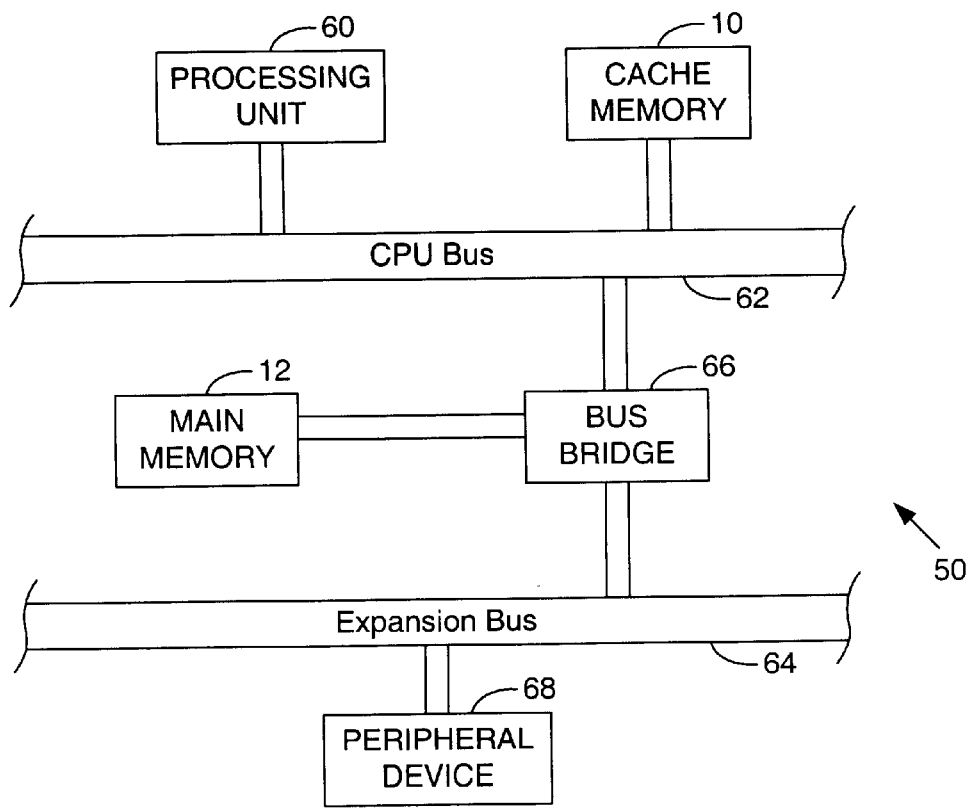
FIG. 6 illustrates an exemplary hardware configuration of the computer system in FIG. 5.

FIG. 6 illustrates an exemplary hardware configuration of the computer system 50. The computer system 50 may comprise a processing unit 60 coupled to an external cache memory 10 via a high-speed CPU bus 62. The processing unit 60 may include one or more of the commercially available processing units, e.g., the Intel x86 family of processors, the Sun SPARC family of processors, etc. As previously described, the cache memory 10 may be internal to the processing unit 60. The system memory 12 is shown coupled to the processing unit 60 via a bus bridge 66. In an alternative embodiment, the physical bus bridge 66 that routes digital signals among various system devices may be absent. Finally, one or more peripheral devices 68 may be coupled to the processing unit 60 via one or more expansion buses 64. Some examples of an expansion bus 64 include a PCI (Peripheral Component Interconnect) bus, an ISA (Industry Standard Architecture) bus, an MCA (Micro Channel Architecture) bus, a USB (Universal Serial Bus) bus, a SCSI (Small Computer System Interface) bus, a Fibre Channel, etc. The peripheral device 68 may be external to the physical unit embodying various other devices of the computer system 50. The peripheral device 68 may include one or more of the following: a hard disk drive, a video monitor, a storage array, a compact disk drive, a floppy disk drive, a keyboard, etc.

The complete operating system may reside in the peripheral device 68, and only a portion of the operating system routines may be loaded into the system memory 12 as shown in FIG. 2. In one embodiment, the storage device 52 may supply necessary memory management software routines to the operating system, which, in turn, may load that software into the system memory 12 during system initialization or at run-time.

Figure 7:
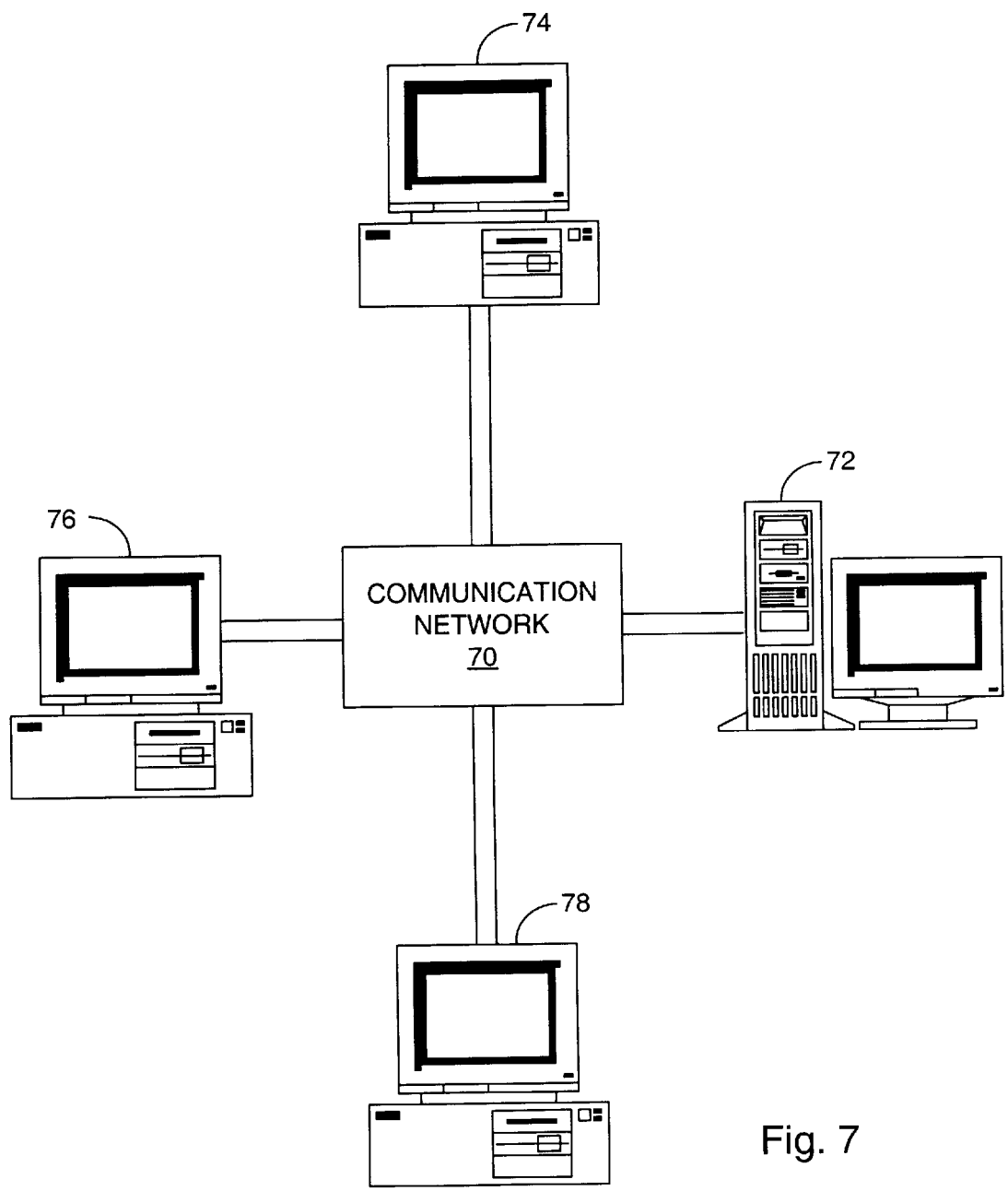
FIG. 7 illustrates one example of how the present invention may be implemented in one computer system using a second computer system in a communication network as a storage medium for the software embodying the teachings of the present invention.

Referring now to FIG. 7, one example of how the present invention may be implemented in one computer system using a second computer system in a communication network as a storage medium for the operating system including the memory management software or simply the memory management software is illustrated. As described before, the computer system 72 may transmit the necessary operating system (with memory management software) routines or simply the memory management software routines to one or more computer systems (74, 76, and 78) connected to it via a communication network 70. The communication network, for example, may be a local area network (LAN), a wide area network (WAN), the Internet, a wireless communication network (including satellite communication), or any other data communication mechanism.

The foregoing discloses a software methodology for cache data management within a computer system. The operating system software within the computer system may be configured to designate one or more selected system memory pages as hot pages. The operating system may then prevent allocation to various application programs of one or more conflict pages that, when cached, map to the selected hot pages within the cache memory in the system. This allows for preserving the hot pages within the cache memory, and is useful especially in a situation where the hot pages contain critical data. The operating system software may be configured to utilize the sorted free list in the system memory to control allocation of one or more conflict pages. The user may also control replacement of hot pages from the cache memory.

While the invention is susceptible of various modifications and alternative forms, specific embodiments thereof are shown by way of examples in the drawings and are herein described in detail. It should be understood, however, that the drawings and detailed description thereto are not intended to limit the invention to the particular forms disclosed, but on the contrary, the intention is to cover all such modifications, equivalents and alternatives as may fall within the spirit and scope of the present invention as defined by the appended claims.

What is claimed is:

1. A storage medium containing a cache data management program, wherein said cache data management program is executable by a computer system when received from said storage medium and placed within a system memory in said computer system, and wherein upon execution said cache data management program performing the following:

designating a first memory space within said system memory in said computer system, wherein said first memory space contains critical data and/or instructions;

identifying a second memory space within said system memory in said computer system, wherein said second memory space maps onto said first memory space when cached; and preventing allocation of said second memory space to one or more applications being executed in said computer system upon caching of said first memory space.

2. The storage medium of claim 1, wherein said preventing said allocation of said second memory space is performed at run-time under user control.

3. The storage medium according to claim 1, wherein said preventing said allocation of said second memory space comprises:

reserving in said system memory a free list that contains location information to access allocable memory pages in said system memory;

placing said location information for said second memory space at the bottom of said free list; and allocating to said one or more applications only those portions of said system memory that are accessible by that location information in said free list which is contained above said location information for said second memory space.

4. An apparatus comprising:

a processing unit;

a cache memory coupled to the processing unit;

a system memory coupled to the processing unit and the cache memory, the system memory including a plurality of pages, wherein the plurality of pages includes a first page and at least one conflict page which maps to a same storage in the cache memory as the first page; and a memory management program which, when executed by the processing unit, is configured to respond to a page allocation request from an application program, and wherein the memory management program is configured to inhibit allocation of the conflict page for use by the application program responsive to the first page being designated as a page to be retained in the cache memory.

5. The apparatus as recited in claim 4 wherein the first page is loaded into the cache memory in response to the processing unit accessing the first page, and wherein the first page remains cached in the cache memory responsive to a lack of access to the conflict page.

6. The apparatus as recited in claim 5 wherein the lack of access to the conflict page is due to a lack of allocation of the conflict page for use by any application program.

7. The apparatus as recited in claim 5 wherein the processing unit, in response to executing the application program, does not access the conflict page.

8. The apparatus as recited in claim 7 wherein the memory management routine is configured to establish a sorted free list of the plurality of pages, and wherein the sorted free list includes the conflict page at a bottom of the sorted free list, and wherein the memory management routine is configured to select a second page of the plurality of pages for use by the application program from a top of the sorted free list.

9. The apparatus as recited in claim 8 wherein the first page is dynamically designated as the page to be retained or not retained in the cache memory, and wherein, responsive to the first page being designated as not to be retained in the cache memory, the memory management routine is configured to allocate the conflict page.

10. The apparatus as recited in claim 4 wherein the cache memory is N-way set associative, wherein N is an integer greater than or equal to two, and wherein the memory management program is configured to allocate N−1 conflict pages in response to page allocation requests before inhibiting allocation of the conflict page.

11. The apparatus as recited in claim 4 wherein the memory management program is part of an operating system.

12. The apparatus as recited in claim 4 wherein the first page is designated by a user.

13. A method comprising:

receiving a page allocation request from an application program; and inhibiting allocating a conflict page for use by the application program in response to the page allocation request, wherein the conflict page maps to a same storage in a cache memory as a first page maps, and wherein the first page is designated as a page to remain in the cache memory.

14. The method as recited in claim 13 further comprising loading the first page into the cache memory in response to an access to the first page, wherein the first page remains cached in the cache memory responsive to a lack of access to the conflict page.

15. The method as recited in claim 14 wherein the lack of access to the conflict page is due to a lack of allocation of the conflict page to any application program.

16. The method as recited in claim 13 further comprising establishing a sorted free list of the plurality of pages, and wherein the sorted free list includes the conflict page at a bottom of the sorted free list.

17. The method as recited in claim 16 further comprising selecting a second page of the plurality of pages for use by the application program from a top of the sorted free list.

18. The method as recited in claim 16 further comprising dynamically designating the first page as the page to be retained or not retained in the cache memory, and responsive to the first page being designated as not to be retained in the cache memory, allocating the conflict page in response to a second page allocation request from an application program.

19. The method as recited in claim 13 wherein the cache memory is N-way set associative, wherein N is an integer greater than or equal to two, the method further comprising allocating N−1 conflict pages in response to page allocation requests before inhibiting allocation of the conflict page.

20. A storage medium including a memory management program configured, when executed, to respond to a page allocation request from an application program, and wherein the memory management program is configured to inhibit allocation of a conflict page for use by the application program responsive to a first page being designated as a page to be retained in a cache memory, the conflict page mapping to a same storage in the cache memory as the first page.

21. The storage medium as recited in claim 20 wherein the memory management program is configured to establish a sorted free list of a plurality of pages of a system memory, the plurality of pages including the first page and the conflict page, and wherein the sorted free list includes the conflict page at a bottom of the sorted free list, and wherein the memory management routine is configured to select a second page of the plurality of pages for use by the application program from a top of the sorted free list.

22. The storage medium as recited in claim 21 wherein the first page is dynamically designated as the page to be retained or not retained in the cache memory, and wherein, responsive to the first page being designated as not to be retained in the cache memory, the memory management routine is configured to allocate the conflict page.

23. The storage medium as recited in claim 20 wherein the cache memory is N-way set associative, wherein N is an integer greater than or equal to two, and wherein the memory management program is configured to allocate N−1 conflict pages in response to page allocation requests before inhibiting allocation of the conflict page.

* * * * *

UNITED STATES PATENT AND TRADEMARK OFFICE
CERTIFICATE OF CORRECTION

PATENT NO.    : 6,408,368 B1
DATED         : June 18, 2002
INVENTOR(S)   : Bodo Parady It is certified that error appears in the above-identified patent and that said Letters Patent is hereby corrected as shown below:

Column 12,
Line 39, please delete "7" and insert -- 4 -- in place thereof.

Signed and Sealed this

Twelfth Day of November, 2002

Attest:

Attesting Officer

JAMES E. ROGAN
Director of the United States Patent and Trademark Office